F. R. HEIL AND A. J. BOSSERT.
INDICATOR.
APPLICATION FILED MAR. 6, 1920.
1,400,436.
Patented Dec. 13, 1921.
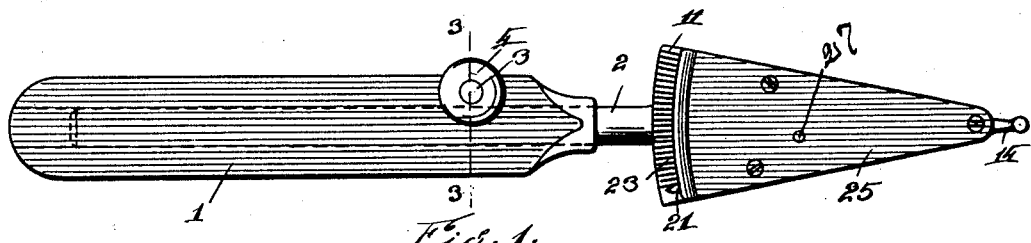
Fig. 1.
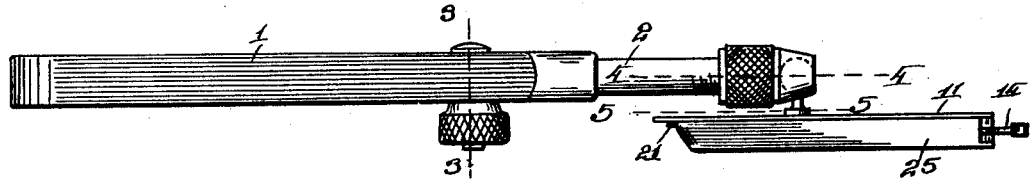
Fig. 2.
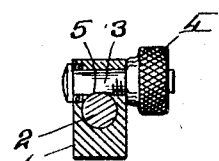
Fig. 3.
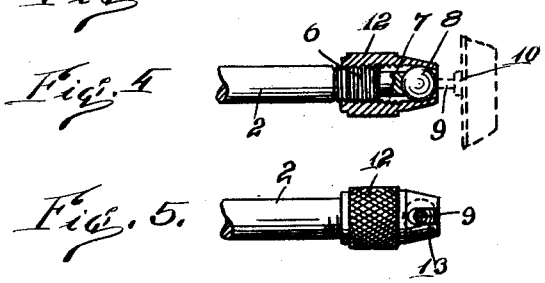
Fig. 4.
Fig. 5.
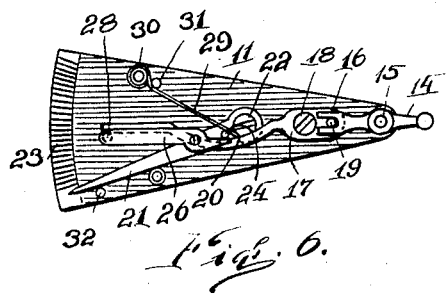
Fig. 6.
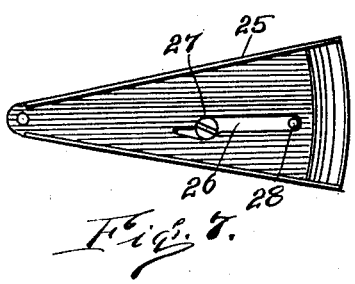
Fig. 7.
INVENTORS
FREDERICK R. HEIL
ALOISIUS J. BOSSERT
BY
ATTORNEY

UNITED STATES PATENT OFFICE.

FREDERICK R. HEIL AND ALOISIUS J. BOSSERT, OF ROCHESTER, NEW YORK.

INDICATOR.

1,400,436.  Specification of Letters Patent.  Patented Dec. 13, 1921.

Application filed March 6, 1920. Serial No. 363,742.

*To all whom it may concern:*

Be it known that we, FREDERICK R. HEIL and ALOISIUS J. BOSSERT, citizens of the United States, residing at Rochester, in the county of Monroe and State of New York, have invented certain new and useful Improvements in Indicators, of which the following is a specification.

The object of this invention is to provide a new and improved form of indicator or gage for detecting inaccuracies, more especially in lathe work, and also in plain surface work.

This and other objects of the invention will be fully illustrated in the drawings, described in the specification and pointed out in the claims at the end thereof.

In the drawings,

Figure 1 is a side elevation of our improved indicator.

Fig. 2 is a top plan view of the indicator.

Fig. 3 is a section on the line 3—3 of Figs. 1 and 2.

Fig. 4 is a vertical section on the line 4—4 of Fig. 2.

Fig. 5 is a side elevation of the universal clamp, the section being taken on the line 5—5 of Fig. 2.

Fig. 6 is a detail view of the indicating dial with the cover removed.

Fig. 7 is a bottom plan view of the cover.

In the drawings, like reference numerals indicate like parts.

As shown in the drawings, the indicator is mounted on a handle or tool holder 1 that is drilled out and is adapted to receive a shank 2. Passing through the tool holder is provided the clamping stud 3, on the end of which is provided a knurled nut 4 which draws the shoulder 5 on the stud against the shank 2 and locks the shank against movement in any direction. The end of the shank 2 is threaded as indicated at 6 and the end of it is made of reduced diameter as indicated at 7 and the tip is recessed to form a seat for a ball of an universal joint. On this seat is provided a ball 8 having a stem 9 integral therewith, the end of which stem is provided with a shoulder as indicated at 10, the reduced end beyond the shoulder engaging with and being riveted into the dial plate 11. A sleeve 12 is provided which makes threaded engagement with the stem 2, the sleeve having a choked end which engages with the ball 8 and clamps it in any position in the seat on the end of the stem. The sleeve is recessed as indicated at 13 to permit the stem 9 being turned thereinto so that it may stand at any angle up to and including a right angle or at a slightly greater angle than a right angle to the stem 2.

On the dial plate 11 are pivoted three levers. The lever 14 is pivoted on the stud 15 and is provided with the forked end 16. The lever 17 is pivoted on the screw 18 and is provided on its short end with a pin 19. The other end of the lever 17 is long and has a bent portion 20 therein.

A third lever 21 is provided, pivoted on the screws 22, which lever is the pointer of the indicator and works in connection with the scale 23. On the lever 21 is provided the pin 24 which is engaged by the bent portion 20 of the lever 17 and as the left hand end of the lever 17 moves up in Fig. 6 through a small angle, it moves the pointer 21 up through a greatly increased angle. The levers 14, 17 and 21 constitute a train of levers which transmits reverses and magnifies the small movement given to the outer end of the lever 14 and measures it on the scale 23.

It will be understood that the lever 14 normally stands in the central position shown in Fig. 6 and the foregoing describes the movement of the lever and the measurements made thereby as it moves up from the center or back to the center in Fig. 6.

In some cases it is desirable, however, to move the pointer downward from the center and measure the movement thereof, and this measurement is obtained as follows:

In Fig. 7 I have shown a bottom plan view of the cover 25 on which the lever 26 is pivoted on the screw 27. This lever at its outer end on the long arm carries a pin 28, which pin will engage on the lower side of the lever 17 at its outer end as shown in Fig. 6. When the outer end of the lever 14 is moved up from normal position, the outer end of the lever 17 will also move up. When the outer end of the lever 14 is moved down from normal position, the outer end of the lever 17 will also move down and away from the pin 24 on the pointer 21 and in the absence of the lever 26, this movement of the lever 17 will not effect the position of the pointer 21. When the cover has been put in place as shown in Figs. 1 and 2 and the lever 26 has been put in its correct position with relation to the other parts as shown in Fig. 6, the outer end of the lever 17 on its under side will engage the pin 28 and as it moves down, will swing the lever 26 on its center. The inner end of the lever 26 engages under the pin 24 on the pointer 21 and as the outer end of the lever 26 swings down, the inner end will swing up and lift the pointer 21 through the pin 24 and cause the pointer to move just as it would be moved by the upward movement of the lever 17 above described.

To hold the parts in normal position for both sets of movements above described, a spring 29 is provided fastened on the screw 30 and being held in correct position by the pin 31 so that its free end bears against the upper end of the pin 24. This holds the pointer 21 in its lowest position, bearing against the pin 32, which acts as a stop for the pointer, as shown in Fig. 6. The position of the pin 24 fixes the normal position of the lever 26 and this in turn fixes the normal positions of the levers 17 and 14.

We claim:

1. In an indicator, the combination of a dial, a contact lever of the second class mounted to swing at one end of said dial, an indicating lever of the third class mounted to swing near the other end of said dial, a lever of the second class to transmit the movement of the contact lever in one direction to the indicating lever, a compound lever including the last named lever for transmitting the movement of the contact lever in the other direction to the indicating lever, said indicating lever normally standing at zero and moving in but one direction therefrom for the movement of the contact lever in either direction from normal.

2. In an indicator, the combination of a dial, a contact lever of the second class mounted to swing at one end of said dial, an indicating lever of the third class mounted to swing near the other end of said dial, a lever of the second class to transmit the movement of the contact lever in one direction to the indicating lever, a compound lever including the last named lever for transmitting the movement of the contact lever in the other direction to the indicating lever, said indicating lever normally standing at zero and moving in but one direction therefrom for the movement of the contact lever in either direction from normal, a cover for said dial, a part of said compound lever being mounted on said cover.

In testimony whereof we affix our signatures.

FREDERICK R. HEIL.
ALOISIUS J. BOSSERT.